US009036137B2

(12) United States Patent
Goldstein et al.

(10) Patent No.: US 9,036,137 B2
(45) Date of Patent: May 19, 2015

(54) OPTICAL LIGHT SOURCE WITH CONTROLLED LAUNCH CONDITIONS

(75) Inventors: Seymour Goldstein, Austin, TX (US); Ian Davidson, Oxfordshire (GB); Mark Goldstein, Austin, TX (US); J. David Schell, Austin, TX (US)

(73) Assignee: Fluke Corporation, Everett, WA (US)

(*) Notice: Subject to any disclaimer, the term of this patent is extended or adjusted under 35 U.S.C. 154(b) by 111 days.

(21) Appl. No.: 13/465,205

(22) Filed: May 7, 2012

(65) Prior Publication Data

US 2013/0293874 A1    Nov. 7, 2013

(51) Int. Cl.
*G01N 21/00* (2006.01)
*G01M 11/08* (2006.01)

(52) U.S. Cl.
CPC ............................ *G01M 11/088* (2013.01)

(58) Field of Classification Search
USPC ........................................................ 356/73.1
See application file for complete search history.

(56) References Cited

U.S. PATENT DOCUMENTS

| | | | | |
|---|---|---|---|---|
| 4,229,067 A | * | 10/1980 | Love | 385/28 |
| 4,979,793 A | * | 12/1990 | Bowen et al. | 385/140 |
| 4,998,792 A | * | 3/1991 | Boerstler et al. | 385/29 |
| 5,138,675 A | * | 8/1992 | Schofield | 385/28 |
| 5,251,002 A | * | 10/1993 | Gryk | 356/73.1 |
| 5,311,614 A | * | 5/1994 | Caron et al. | 385/140 |
| 5,684,912 A | * | 11/1997 | Slaney et al. | 385/140 |
| 5,963,313 A | * | 10/1999 | Anderson | 356/73.1 |
| 6,466,728 B1 | * | 10/2002 | Radloff et al. | 385/140 |
| 6,681,600 B1 | * | 1/2004 | Mitchell et al. | 65/473 |
| 7,945,130 B2 | * | 5/2011 | Yan et al. | 385/28 |
| 2010/0290738 A1 | * | 11/2010 | Yan et al. | 385/28 |
| 2011/0013904 A1 | * | 1/2011 | Khermosh et al. | 398/16 |
| 2011/0064367 A1 | * | 3/2011 | Molin et al. | 385/100 |

* cited by examiner

*Primary Examiner* — Tarifur Chowdhury
*Assistant Examiner* — Omar Nixon
(74) *Attorney, Agent, or Firm* — Locke Lord LLP; Scott D. Wofsy; Christopher J. Capelli (57) ABSTRACT

A system, apparatus and method for providing controlled launch conditions to an optical light source comprises adjustable fiber bending/deforming apparatus to allow adjustment of the device such that multimode launch conditions can be accurately controlled. Both LED light source and OTDR/laser implementations are provided.

3 Claims, 7 Drawing Sheets

OPTICAL LIGHT SOURCE WITH CONTROLLED LAUNCH CONDITIONS

BACKGROUND OF THE INVENTION

In optical network test and measurement applications, it is important to accurately control multimode launch conditions from a light source for the purpose of improving consistency of fiber attenuation measurements, whether in an LED light source application or an OTDR application.

A problem that arises is controlling the launch condition from a multimode source, whether it is an LED source or a laser source, such that the number of mode groups is launched with a high degree of precision. Controlling the mode groups in multimode fiber is the key to making repeatable, accurate, and consistent loss measurements with a light source and power meter.

Figure 1:
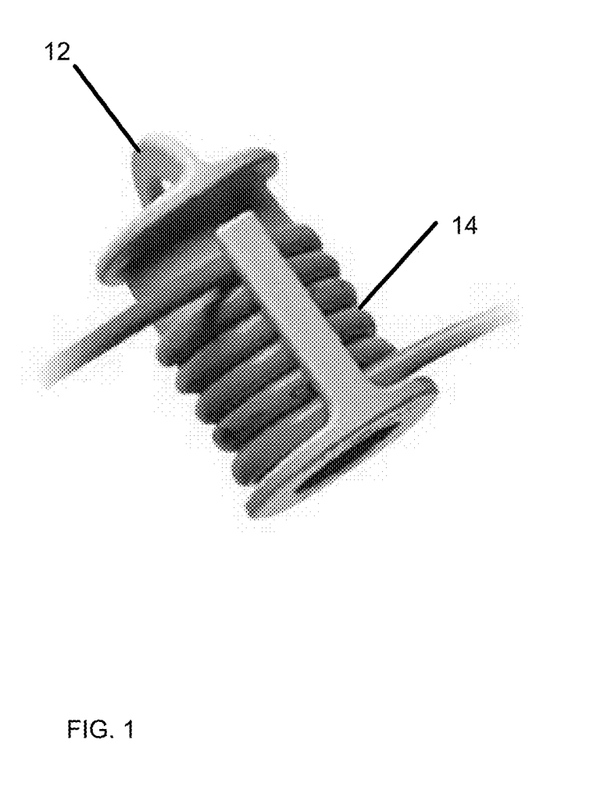
FIG. 1 is a view of a mandrel with wrapped fiber in accordance with the prior art.

The most common method for controlling launch conditions is to use a mandrel wrap of specified diameter and number of turns. With reference to FIG. 1, a view of a mandrel, the mandrel 12 is configured to receive multiple wraps of fiber 14. This method will strip out the loosely coupled higher order modes that cause attenuation measurement inconsistency. However, this method does not provide consistent loss measurements from light source to light source because each light source has a unique launch condition depending on how a fiber is coupled to the source and the manufacturer of the source. Variations as high as 50% are possible. With emerging standards requiring variation reductions to 10%, such as Encircled Flux (EF), a new method for controlling launch conditions is needed.

A second problem that arises is providing a source that can accommodate different multimode fiber sizes and different wavelengths. It is advantageous for the customer to use one light source that can be used with 50 μm fiber, for example and have a controlled launch condition that is satisfied for two wavelengths, such as 850 nm and 1300 nm, from the same launch cord.

Previous EF compliant mode controllers were meant to be universal such that they can be used with any LED light source. However, these devices are large, heavy, and difficult to use and manufacture.

A problem that arises in connection with OTDR is insertion loss at the output of the device. While a certain amount of loss is expected between the output and input of the device, it is important that the loss remain at a "reference grade termination". A reference grade termination is one that achieves a loss of less than 0.1 dB. Per standards requirements, a reference grade termination is required at interface connections of launch cords.

Previous art for controlling the launch condition of a multimode source was to wrap the test cord around a mandrel of specified size, with 5 turns for example, as in FIG. 1. This mandrel required a circular device of fixed outside diameter, such as 20 mm, unto which the fiber cable was wrapped. This configuration creates a stacking effect, which causes the mandrel to increase in height.

SUMMARY OF THE INVENTION

In accordance with the invention, an improved method and apparatus is provided for controlling launch conditions. A fiber bending apparatus provides an adjustable bend point to a fiber, whereby adjustment of the bend amount enables adjustment of the launch conditions to a desired amount. The fiber is then secured with the desired degree of bending.

Accordingly, it is an object of the present invention to provide an improved launch condition controlling device and method.

It is a further object of the present invention to provide an improved method and apparatus for providing an adjustable launch condition controller.

It is yet another object of the present invention to provide an improved device and method for providing reproducible launch conditions.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DETAILED DESCRIPTION

The system according to a preferred embodiment of the present invention comprises a system and method for providing a controlled bend to a fiber in a test setup, to provide adjustable controlled launch conditions.

An improved method is one where a fiber loop shape is changed or a bend is fixed or variably controlled, thus removing the need for a stack configuration.

The principal of achieving a specific launch condition such as EF requires that a light source emit an over-filled launch, one that has the maximum number of modes excited with a uniform modal distribution, followed by a mode filter that strips out the necessary modes to reach the required launch. This principal can be generally applied to either LED or laser light sources that are over-filled or under-filled.

Figure 2:
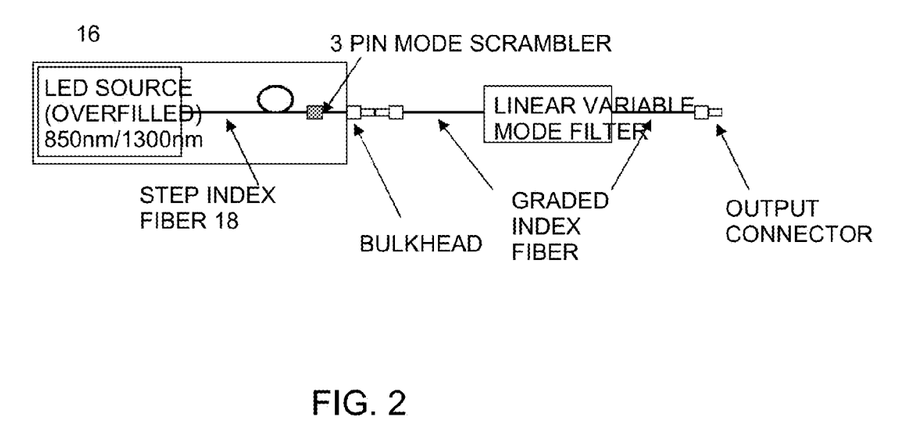
FIG. 2 is an illustration of a testing system in accordance with the present disclosure.
Figure 3:
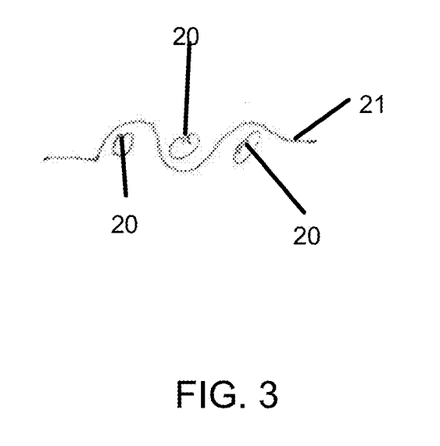
FIG. 3 is a diagram of a mode scrambler accordance with the present disclosure.

With reference to FIG. 2, a block diagram of a system in accordance with the present disclosure, a preferred method for achieving EF compliance with a unique LED source, no matter the supplier, is to pigtail a dual wavelength combiner (LED) 16 at 850 nm and 1300 nm with a step index fiber 18 of size 105/125 μm for example. The step index fiber will serve two purposes. First, this will provide an over-filled launch at the tester bulkhead so that a test cord with mandrel can be concatenated to it. Second, the step index fiber allows the source to be used with either 50 µm or 62.5 µm test reference cord, each tuned accordingly. In this way, the step index fiber reduces the variance between sources by launching a predictable modal distribution. The step index fiber is suitably attached directly to the LED source. The addition of mode scrambler (i.e. 3 adjacent pins 20 in which the step index fiber 21 passes by in serpentine fashion as in FIG. 3) to the step index fiber will also improve the modal power distribution so that all modes are equally excited. This provides an EF response closer to the target at all control points (radial points). This 3 pin device can be fashioned to be attached to the step index fiber at any convenient location.

Figure 4:
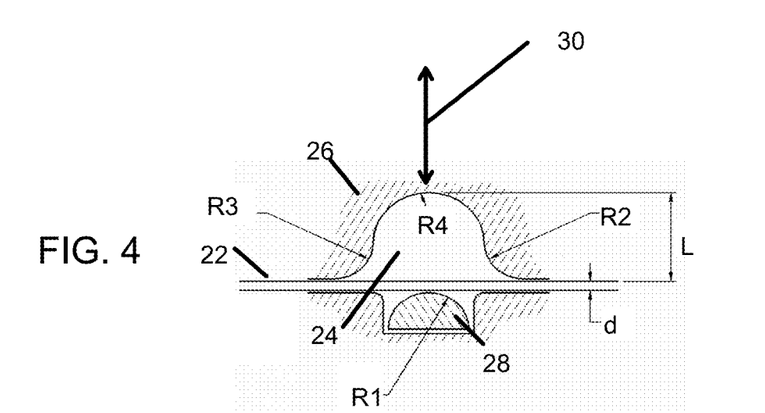
FIGS. 4-6 illustrate a linear mode scrambler in accordance with the present disclosure.
Figure 5:
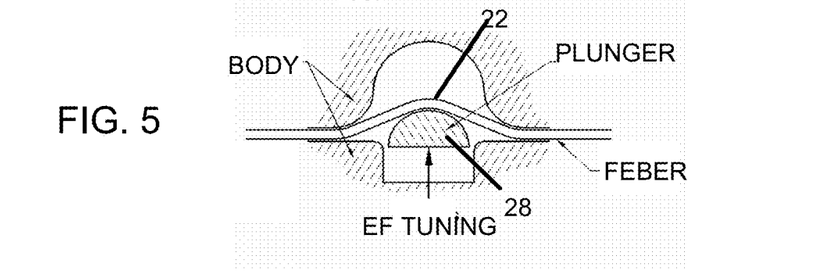
Figure 6:
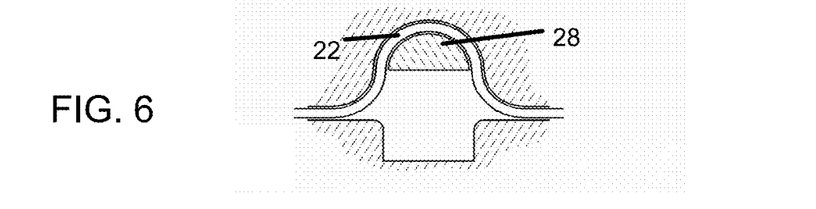

A linear variable mandrel, shown in FIGS. 4-6, has fixed reference grade connectors on each end of the protruding fiber cables and bends the internal fiber using an adjustable internal plunger, while monitoring the EF response at which point a set screw is fixed and the internal contents are potted. The purpose of the mandrel is to fine tune for the variation between individual fibers, which can then be used with any suitable source. In other words, each variable mandrel and test cord is adjusted accordingly in the factory, using a standard dual wavelength LED of nominal wavelength. Each of these variable mandrels and test cords can now be used with any of the manufacturer's unique production LED sources in the field. This device cannot be used on another manufacturer's LED source. The variable mandrel and test cord may be manufactured with either graded index fiber 50/125 µm or 62.5/125 µm. Each size of graded index fiber uses fiber with a controlled core tolerance of ±1 µm or less, so that variability is reduced which helps reduce the tuning range of the variable mandrel and thus its size. This variable-mandrel has a comparable size, weight, and ease of use as to what customers use today. However, the height is significantly reduced to the thickness of the test cord, which may be 3 mm.

In the views of FIGS. 4-6, illustrating the linear mode scramble, the fiber 22 passes through a chamber 24 inside body 26, passing over the top of plunger 28. Plunger 28 has a concave down curved surface that abuts the fiber. The plunger is movable up and down along the axis of direction 30, whereby moving upwardly will bend the fiber more and moving downward will bend the fiber less. FIG. 4 illustrates the plunger in the fully retracted position, FIG. 5 shows a partial extension of the plunger and corresponding partial bend of the fiber, while FIG. 6 shows a fully extended position of the plunger, and the accompanying full bend of the fiber.

For calibration of the device, appropriate test equipment is connected, and the plunger is adjusted to bend the fiber to provide the desired transmission conditions. On completion of the required mode distribution setting by adjustment of the plunger, the fiber can be permanently secured in place if required. This can be achieved by clamping the fiber by any suitable means at the input and exit ends of the LVM assembly and/or, potting the fiber by injecting of a suitable compound into the empty space around the fiber.

The linear variable mandrel (LVM) provides a suitable means of varying the bend radius of a short length of optical fiber to provide tuning of the mode distribution within the fiber. Used in conjunction with a suitable optical source providing an over-filled launch condition, the LVM acts as a real time adjustable mode filter allowing setting of the optical output mode distribution from the fiber to be compliant with established encircled flux standards. Fast and accurate mode distribution setting is achieved as a result of the step-less nature of the adjustment method.

Radii $R1$, $R2$ and $R3$ can be specified within individual LVM designs to provide different ranges of mode filtering and to accommodate fibers of different outer cladding or jacket diameters. If $R1=R2=R3$, the minimum equivalent fiber loop diameter will be equivalent to winding the fiber a single turn around a fixed mandrel of diameter $2 \times R1$, assuming that $L \sim (R1+R4)$, where $R4=(R1+d)$, d is the fiber outer cladding or jacket diameter. The actual bend radius of the fiber core is approximately $R1+(d/2)$. The maximum equivalent fiber loop diameter is infinity when the fiber path is straight through. Therefore, for an LVM compliant with the criteria specified above, the adjustment range of equivalent mandrel diameters is $2R$ to $\infty$.

The principle of operation does not require $R1$, $R2$ and $R3$ to be equal or $L \geq (R1+R4)$. Changes to these parameters will however affect the adjustment range available. It is advisable that $R4 \geq (R1+d)$ to maximize adjustment range within given overall LVM package dimensions. $R4<(R1+d)$ will not necessarily prevent some mandrel adjustment. Only practical considerations limit the dimensions of $R1$, $R2$ and $R3$. Too small could cause permanent damage to the fiber and too large would have minimal effect on mode distribution within the fiber.

EXAMPLE 1

Figure 7:
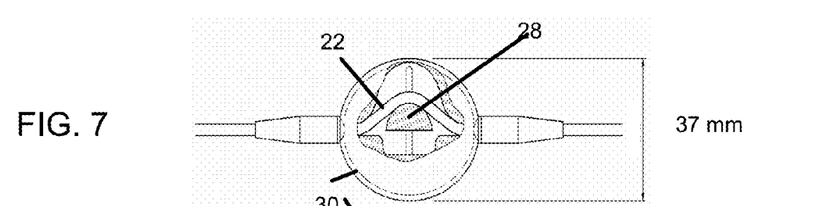
FIG. 7 is a view of a particular example of a linear variable mandrel, with a magnified sectional cut-away central portion.
Figure 8:
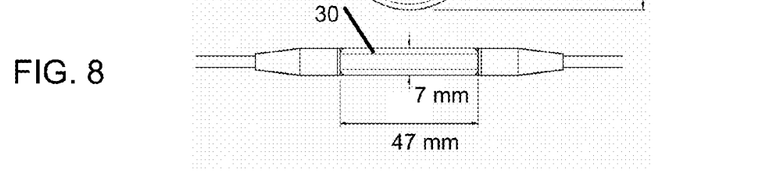
FIG. 8 is a view of how the linear variable mandrel embodiment appears to external view.

With reference to FIGS. 7 and 8, an example embodiment of the LVM principle is illustrated. In this example, $R1$, $R2$ and $R3$ are 8 mm and, as it has been determined that the full adjustment range possible with $R=8$ mm is not necessary, $L<(R1+R4)$. This allows more compact external package dimensions. The fiber has a 3 mm diameter rugged jacket.

FIG. 7 is a magnified view of a portion of the particular example of a linear variable mandrel, wherein in the fiber leads into a central portion 30, illustrated in magnified sectional view in FIG. 7, where plunger 28 is raised to bend the fiber 22 to the desired amount to provide appropriate conditions. FIG. 8 is a view of how the linear variable mandrel embodiment appears to external view, where a particular length of the central variable mandrel portion is 47 mm, and the diameter of the linear variable mandrel is 7 mm.

Figure 9:
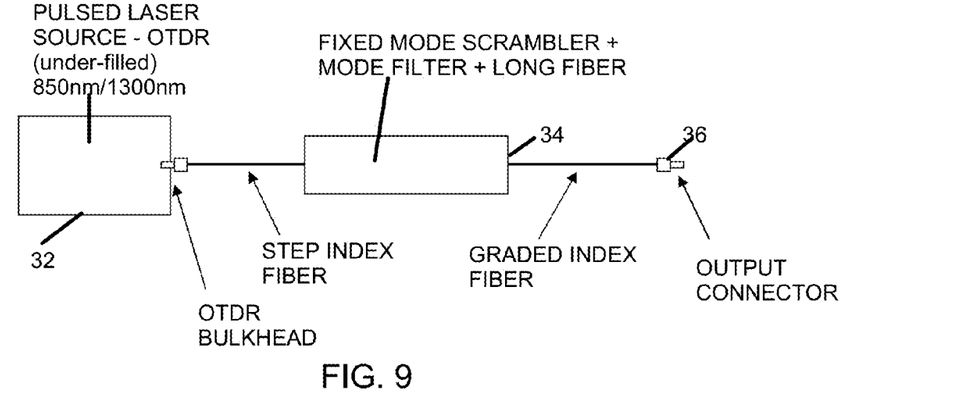
FIG. 9 is a block diagram of an OTDR embodiment of the disclosure.

FIG. 9 is a block diagram of the concepts of the present disclosure applied to an OTDR system, wherein a pulsed laser source 32 is supplied to a fixed mode scrambler+mode filter+long fiber block 34, the output thereof provided to output connector 36.

The principal of achieving a specific launch condition such as EF for an under-filled launch, such as a laser used in an OTDR, is similar to the previously described method and apparatus for an LED, with the exception that more mode excitation is needed. Another change is the addition of a length of fiber, typically about 100 meters, normally used as a launch cord so that the first connector, in a network under test, can be characterized.

For an individual under-filled launch, such as a laser source, an internal step index fiber with a mode scrambler, needed to create an over-filled launch, is used to provide an over-filled launch, followed by a mode filter as shown in FIG. 9. However, for an OTDR, any type of internal instrument modifications will change the optical performance so an external modal conditioner is needed. Therefore, the entire assembly is maintained as an external device.

In the view of FIG. 9, the external modal conditioner (ModCon) 34 has two fixed fiber cables terminated with fixed connectors. At the input, a step index fiber is used while at the output, a graded index fiber is used, either 50/125 µm or 62.5/125 µm size. Internally the step index fiber is affixed with a spring-loaded clamp that bends the fiber at one point in a unique manner such that a uniform distributed over-filled launch is achieved. This method reduces the insertion loss and is an improvement over previous methods such as using multiple bends in a serpentine manner, or applying fiber over fiber pressure. The step index fiber is then fusion spliced onto a long length of fiber such as 100 meters the purpose of which is to provide optical distance between the OTDR and first connector under test. Just prior to the 100 meter length, a mode filter strips out higher order modes and achieves the desired EF compliant launch. For the mode filter in this case, multiple loops of fiber are deformed with a plunger such that the shape becomes oval. It is also important that the 100 meters of fiber has a large enough diameter such as 100 mm so that no further mode filtering is initiated.

A preferred manner to accomplish the desired result is to sequence the fiber sections, mode scrambler, fiber length, and mode filter such that the mode filter does not add insertion loss at the bulkhead connection on the output fiber, accomplished by moving the mode filter to the left side of the 100 meter fiber length. This is important when a "reference grade termination" is required, an insertion loss of less than 0.1 dB as required by several international standards. This can be done my moving the mode filter near the mode scrambler and then adding the long length of fiber. Since the output of the long length of fiber is monitored for EF while the mode filter is adjusted, it makes no difference that the mode filter is placed accordingly.

Figure 10:
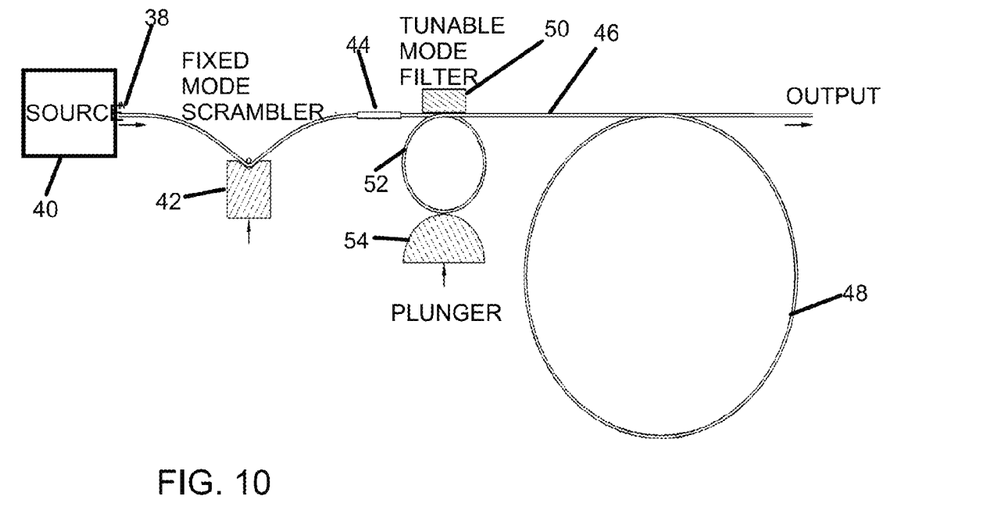
FIG. 10 is a cross sectional view of a fixed mode scrambler, variable mandrel, and 100 meter fiber embodiment.

With reference to FIG. 10, a cross sectional view of a fixed mode scrambler, variable mandrel, and 100 meter fiber embodiment, an input step index fiber 38, having one end attached to the output of a laser source (or OTDR) 40, is passed through a fixed mode scrambler 42 having a unique bend shape, causing the fiber to form accordingly. This unique shape is defined such that the loss is minimized while modal excitation is maximized. This one location clamp technique produces an equivalent modal distribution as other more complicated methods requiring several bending locations. The fixed mode scrambler can comprise, for example, a spring biased or fixed clamp that forces the fiber to be deformed by a small pin. The step index fiber is then fusion spliced at 44 onto either a 50/125 µm or 62.5/125 µm graded index fiber 46 using a recoating process in lieu of a fusion splice sleeve. Following this is a length 48 of 100 meters of graded index fiber, used as the launch fiber, looped to minimize bending loss, and proceeded by a deformable fiber loop 52 used as the mode filter 50, deformed for example by adjustable plunger 54 which variably deforms the loop 52 to provide the desired launch conditions.

Figure 11:
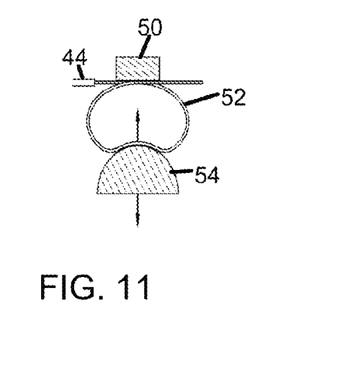
FIG. 11 is a view of an exemplary amount of deformation of the loop.

FIG. 11 illustrates an exemplary amount of deformation of the deformable loop 52 after tuning by adjustment of the plunger.

Figure 12:
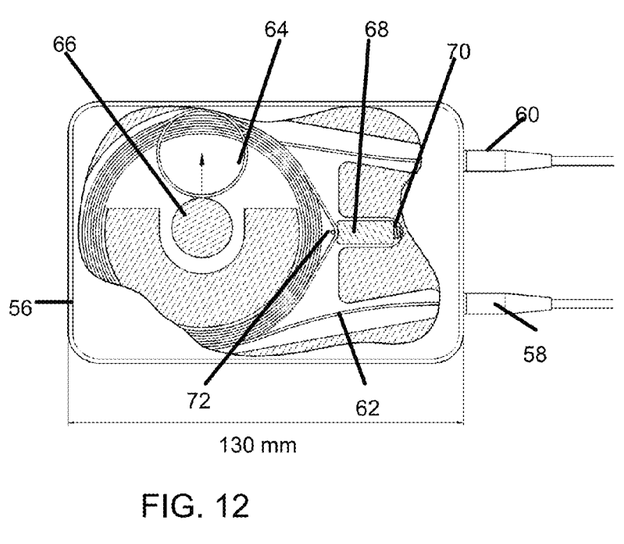
FIG. 12 is a partial cross sectional top view of an embodiment of an OTDR ModCon.
Figure 13:
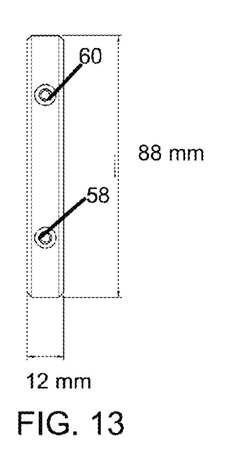
FIG. 13 is an end view of the ModCon of FIG. 11.

FIG. 12 is an partial sectional view of an example of an OTDR ModCon embodiment, wherein the device is enclosed in a case 56 which has input and output connectors 58, 60 to connect to the test instrument and network cable. Step index fiber 62 is connected to the 100 meter fiber that is looped repeatedly to accommodate the (for example) 100 meters length inside the case. Fiber loop 64 interfaces with adjustable plunger 66 to provide the adjustment of launch conditions, while fixed mode scrambler 68 is provided in the form of a spring 70 biased pin 72 interfaced with the fiber. The case 56 has a length dimension of 130 mm for example. FIG. 13 is an end view of the case 56, with an exemplary width of 88 mm and height of 12 mm.

Accordingly, an improved method and apparatus of providing controlled launch conditions for an optical light source is provided.

For the LED source, this present method and apparatus solves the size, weight and difficulty of use problem by reducing the size and weight, and providing ease of use, as compared to what customers use today.

For the laser source case such as an OTDR, this method and apparatus solves the problem of integrating an improved method of combining the elements of a mode scrambler, mode filter, and length of fiber. By bringing the OTDR into EF compliance and controlling the launch condition accordingly, attenuation measurements made on a permanent fiber link or channel will correlate well with a light source and power meter combination.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

What is claimed is:

1. A fiber optic modal conditioner, comprising:
    a fixed mode scrambler in which a portion of a step index optical fiber is disposed, wherein said fixed mode scrambler deforms the portion of the step index optical fiber to achieve a desired degree of bending of the step index optical fiber portion and wherein a first end of the step index optical fiber is directly connected to an output of a light source;
    a tunable mode filter having a first and a second end, the first end of the tunable mode filter is directly connected to the fixed mode scrambler at a second end of the step index optical fiber, the tunable mode filter comprising a first fiber loop;
    a graded index optical fiber portion having a first and a second end, the first end of the graded index optical fiber portion connected to the second end of the tunable mode filter; and
    a launch optical fiber portion connected to the second end of the graded index optical fiber, the launch optical fiber portion comprising a second fiber loop.

2. The fiber optic modal conditioner according to claim 1, wherein said tunable mode filter further comprises an adjustable plunger configured to adjustably deform said first fiber loop to achieve desirable launch conditions.

3. The fiber optic modal conditioner according to claim 1, wherein the length of said launch optical fiber portion is approximately 100 meters.

* * * * *